United States Patent
Le et al.

(10) Patent No.: US 6,707,593 B2
(45) Date of Patent: Mar. 16, 2004

(54) SYSTEM AND PROCESS FOR ACTUATION VOLTAGE DISCHARGE TO PREVENT STICTION ATTACHMENT IN MEMS DEVICE

(75) Inventors: Minh Van Le, Methuen, MA (US); Jo-Ey Wong, Brookline, MA (US)

(73) Assignee: Axsun Technologies, Inc., Billerica, MA (US)

( * ) Notice: Subject to any disclaimer, the term of this patent is extended or adjusted under 35 U.S.C. 154(b) by 59 days.

(21) Appl. No.: 09/850,720

(22) Filed: May 8, 2001

(65) Prior Publication Data

US 2002/0167713 A1 Nov. 14, 2002

(51) Int. Cl.[7] .............................................. G02B 26/00
(52) U.S. Cl. ..................... 359/291; 359/214; 359/224; 359/290
(58) Field of Search ................................ 359/290, 291, 359/292, 293, 214, 224, 847, 225; 361/234; 307/125; 200/181

(56) References Cited

U.S. PATENT DOCUMENTS

| 5,278,368 | A | * | 1/1994 | Kasano et al. ............... 200/181 |
| 5,459,610 | A | | 10/1995 | Bloom et al. ................ 359/572 |
| 6,031,657 | A | * | 2/2000 | Robinson et al. ............ 359/293 |
| 6,127,744 | A | * | 10/2000 | Streeter et al. .............. 307/125 |
| 6,160,230 | A | * | 12/2000 | McMillan et al. ........... 200/181 |
| 6,538,798 | B2 | * | 3/2003 | Miller et al. ................. 359/291 |

OTHER PUBLICATIONS

Gui, C,; Veldhuis, G.J.; Koster, T.M.; Lambeck, P.V.; Berenschot, J.W.; Gardeniers, J.G.E.; and Elwenspoek, M., "Nanomechanical Optical Devices Fabricated With Aligned Wafer Bonding," Mesa Research Institute, University of Twente, The Netherlands. IEEE 1998.

* cited by examiner

Primary Examiner—Georgia Epps
Assistant Examiner—Tuyen Tra
(74) Attorney, Agent, or Firm—J. Grant Houston

(57) ABSTRACT

An electrostatically operated microelectromechanical system comprises a movable and a stationary structure, with a discharge system that is activated upon pull-in of the movable structure to discharge the voltage across an electrostatic cavity to thereby prevent stiction adhesion of the movable structure to the stationary structure. Specifically, a membrane release structure comprises a mirror optical element. The membrane is separated from a stationary support by an electrostatic cavity. The discharge switch comprises a membrane conductor pad on the membrane and a support conductor pad on the support that conducts a current upon activation of the discharge switch to discharge the electrostatic voltage. Preferably, these pads are metal.

20 Claims, 8 Drawing Sheets

SYSTEM AND PROCESS FOR ACTUATION VOLTAGE DISCHARGE TO PREVENT STICTION ATTACHMENT IN MEMS DEVICE

BACKGROUND OF THE INVENTION

Examples of microelectromechanical (MEMS) release structures include the micro-optical electromechanical system (MEOMS) membrane and cantilevered arm. Both of these structures are used in various optical applications. For example, they are fabricated to have a concave surface that is coated to be reflective and then paired with another mirror to form a tunable Fabry-Perot (FP) cavity/filter. They can also be used to define the end of a laser or interferometer cavity or shaped to function as a diffractive or refractive lens operating in transmission, for example.

The structures are typically produced by depositing a device layer over a sacrificial layer, which has been deposited on a support or handle layer. This sacrificial layer is subsequently completely or partially etched away or otherwise removed to produce the release structure in a release process. In some examples, the device layer is silicon or a silicon compound and the sacrificial layer can be polyimide or oxide, for example.

Typically, release structure deflection is achieved by applying a voltage between the release structure and a fixed electrode on the support structure. Electrostatic attraction moves the structure in the direction of the fixed electrode as a function of the applied voltage to control reflector separation or focal point location, for example.

One chronic problem associated with MEMS devices, in general, is stiction. The most common definition for stiction is the strong interfacial adhesion that is present between contacting crystalline microstructure surfaces. The term has also evolved to include sticking problems such as friction driven adhesion and humidity driven capillary forces on an oxide surface. Here, stiction is the unintentional adhesion in MEMS devices.

If deflected sufficiently to contact an adjoining surface, a release structure can adhere to, or snap-down on, that surface. This problem can be more intractable in the context of the optical release structures since anti-stiction coatings may not work well enough or may be incompatible with the required optical coatings, such as antireflective (AR) coatings or dielectric, highly reflecting (HR) coatings, for example. Moreover, these optical coatings are typically smooth because of the focus on optical performance, which smoothness typically increases the level of stiction forces in the event of contact since the magnitude of the stiction force is typically related to the contact area.

SUMMARY OF THE INVENTION

Stiction adhesion can be both a manufacturing yield problem and a performance problem after deployment. During manufacture, electrostatic charge build-up, caused by ambient atmospheric charge, electrostatic discharge (ESD) events during handling, or deposition processes, or capillary forces from wet-etch processes, for example, can lead to snap-down of the release structure. During operation, shock, excessive drive voltage, or system level ESD events can also cause snap-down.

Stiction adhesion is even more problematic in the case of electrostatically-driven MEMS microstructures. The electrostatic forces acting on the structure increase dramatically for a constant drive voltage as the structure passes through its stability point and travels across the electrostatic cavity toward the cavity's stationary electrode. The structure can be further held against the contacting surface if the voltage is not immediately dissipated.

The present invention is directed to a microelectromechanical system. It is typically used in electrostatically operated micromechanical systems. Specifically, in order to prevent adhesion between a movable and another structure such as a stationary structure, a discharge system is activated upon pull-in of the movable structure to discharge the voltage across an electrostatic cavity to thereby prevent stiction adhesion of the movable structure to the stationary structure.

In general, according to one aspect, the invention features a micro-mechanical system. The system comprises a movable structure and a stationary structure. A cavity is provided across which an electrostatic voltage can be generated to pull-in the movable structure in a direction of the stationary structure. A discharge switch is activated by the pull-in of the movable structure to discharge the electrostatic voltage.

In general, according to another aspect, the invention features an electrostatically actuated optical system. This system comprises an optical element and an electrode defining an electrostatic cavity, across which an electrostatic voltage can be generated to drive movement of the optical element. A discharge switch is mechanically activated by pull-in of the optical element to discharge the electrostatic voltage.

In current implementations, the optical element includes a mirror structure that can be fabricated from a thin film (i.e., quarter wave thickness, typically) dielectric stack. Usually, the optical element is formed on a release structure. The release structure is currently a membrane. In the present embodiment, the discharge switch comprises a membrane conductor pad on the membrane that conducts a current upon activation of the discharge switch to discharge the electrostatic voltage. Currently, this pad is a metal. Preferably, there is also provided an opposed electrode conductor pad on the electrode that conducts the current upon activation. Upon pull-in, the membrane conductor pad contacts the electrode conductor pad.

In general, according to still another aspect, the invention features an electrostatically actuated optical system that comprises a support structure and a membrane structure that is separated from the support structure by an electrostatic cavity. Conductive stiction pads are provided between the support structure and the membrane structure that discharge a voltage across the electrostatic cavity in the case of pull-in of the membrane structure to the support structure.

Finally, according to still another aspect, the invention features a process for fabricating stiction features on an electrostatically driven optical membrane or other release structure. This process comprises releasing a device layer from a support structure to form a release structure and depositing support structure conductor pads on the support structure through the release structure. In this way, the release structure can functions as a shadow mask for the patterning of the support conductor pads, some implementation examples.

Depending on the embodiment, the discharge switch can be fabricated prior to or after the release of the release structure.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
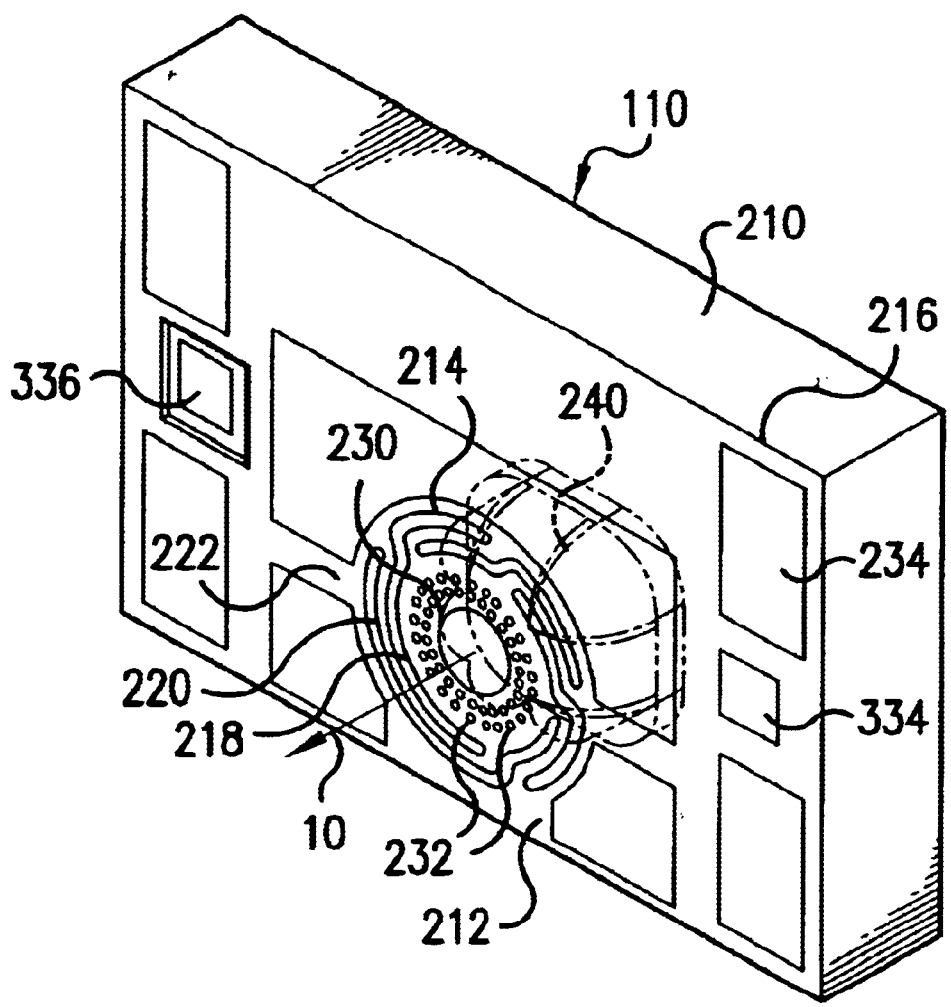
FIG. 1 is a perspective view of the inventive optical membrane device showing the optional backside optical port, in phantom.

FIG. 1 shows an optical membrane device 110 to which the principles of the present invention are applicable in one implementation.

Generally, the optical membrane device 110 comprises handle material 210 that functions as a support. Currently, the handle material is wafer material such as from a silicon handle wafer, which has been subsequently singulated into the illustrated device.

A device or membrane layer 212 is added to the handle wafer material 210. The release or membrane structure 214 is formed in this device layer 212. Currently, the device layer is between 5 and 10 micrometers in thickness. Preferably, it is between 6 and 8 micrometers in thickness.

An electrically insulating or sacrificial layer 216 separates the membrane layer 212 from the handle wafer material 210 and further defines an electrostatic cavity between the membrane and the electrode of the handle wafer. During manufacture, this insulating layer functions as a sacrificial or release layer, which is partially removed to release the membrane structure 214 from the handle wafer material 210. In the preferred embodiment, this insulating layer is between 3 and 6 micrometers in thickness.

Currently, the membrane layer 212 is silicon by, for example, wafer bonding a silicon wafer to the insulating layer 216 under elevated heat and pressure. Other alternatives are, however, silicon nitride, polycrystalline silicon, or essentially single crystal silicon, which have been deposited or formed on the insulating layer.

In the illustrated embodiment, the membrane structure 214 comprises a body portion 218. The optical axis 10 of the device 100 passes concentrically through this body portion 218 and orthogonal to a plane defined by the membrane layer 212. A diameter of this body portion 218 can be 300 to 600 micrometers, currently it is about 500 micrometers.

Tethers 220 extend at least partially in a radial direction from the body portion 218 to an outer portion 222, which comprises the ring where the tethers 220 terminate. In the current embodiment, a spiral tether pattern is used. The specific example illustrated in FIG. 1 is a dog-leg spiral pattern. Other examples include tethers that extend only in the radial direction.

An optical coating dot 230 is typically deposited on the body portion 218 of the membrane structure 214. In a Fabry-Perot filter or other application requiring a reflecting release structure, the optical dot 230 is preferably a highly reflecting (HR) dielectric mirror stack. This yields a highly reflecting, but low absorption, structure that is desirable in, for example, the manufacture of high finesse Fabry-Perot filters. The optical dot can have a concave curvature to form a concave lens. Alternatively, a convex curvature can be provided with an AR coating, for example, to thereby form a movable lens.

In the illustrated embodiment, bond pads 234 are deposited on the proximal side of the membrane device 210. These are used to solder bond, for example, a stationary mirror structure onto the proximal face of the membrane device 110. Bond pads 234 are also useful when installing the membrane device 110 on a micro-optical bench, for example. Also provided are a membrane layer wire bond pad 334 and a handle wafer wire bond pad 336. The membrane layer bond pad is a wire bonding location for electrical control of the membrane layer. The handle wafer bond pad 336 is a wire bond pad for electrical access to the handle wafer material.

An optical port 240 (shown in phantom) is provided, in some embodiments, extending from a distal side of the handle wafer material 210 to the membrane structure 214. Whether or not this optical port 214 is required depends upon whether the membrane device is intended to function in transmission and the transmissivity of the handle wafer material 210 at the optical wavelengths over which the membrane structure 110 must operate. Typically, with no port, the handle wafer material along the optical axis must be AR coated if the transmission is required.

In the illustrated embodiment, artifacts of the manufacture of the membrane structure 214 are release holes 232. These holes allow an etchant to pass through the body portion 218 of the membrane structure 214 to assist in the removal of the insulating layer 216 during the release process. Currently, the release holes are less than 20 micrometers, preferably less than 10 micrometers in diameter. Specifically, the holes are about 5 micrometers in diameter and extend through a 9 micrometer membrane layer.

According to the invention, a discharge switch system is formed between the deflecting membrane structure 214 and the stationary support structure 210. Membrane and support conductor pads are conveniently patterned using these release holes 232 according to one implementation of the invention.

Figure 2:
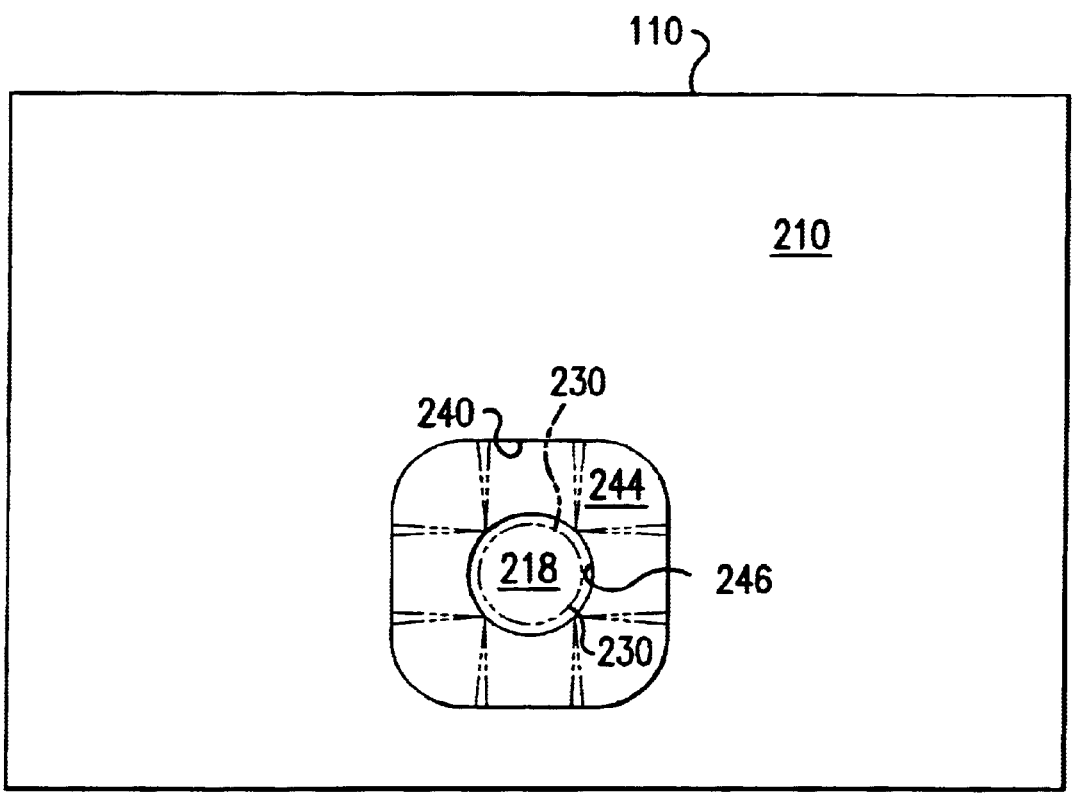
FIG. 2 is an elevation view of the distal side of the inventive optical membrane device showing the optical port.

FIG. 2 further shows the optical port 240 formed through the distal or back side of the handle wafer material 210 in the optical membrane device 110. Specifically, the optical port 240 has generally inward sloping sidewalls 244 that end in the port opening 246. As a result, looking through the distal side of the handle wafer material, the body portion 218 of the membrane structure can be observed and is preferably concentric with the optical coating 230.

FIGS. 3A through 3G illustrate a process for fabricating a membrane device according to the present invention.

Figure 3A:
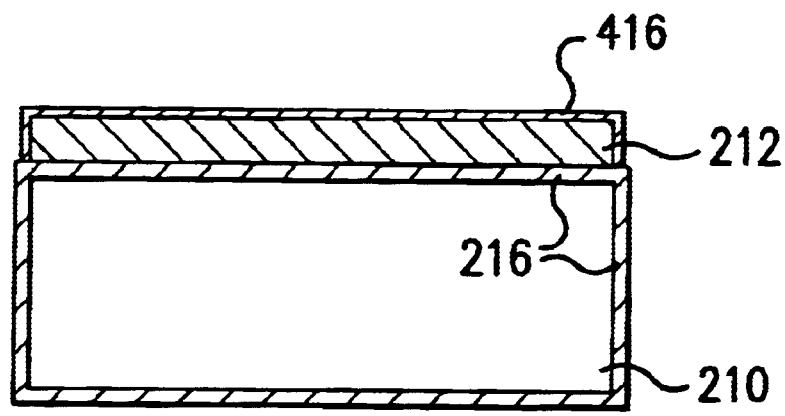
FIGS. 3A through 3G are schematic, partial cross-sectional views illustrating a process for fabricating a membrane device according to the present invention.

Referring to FIG. 3A, the process begins with a support or handle wafer 210, which in one embodiment is a standard n-type doped silicon wafer.

The wafer 210 is oxidized to form the sacrificial insulating layer 216. The sacrificial insulating layer 216 defines the length of the electrostatic cavity. Design rules for electrostatic cavities typically dictate that the membrane can only be deflected across approximately one-third of the cavity length. Presently, the preferred embodiment uses an oxide thickness of 4 µm +/–5%.

The membrane layer 212 is then installed or deposited on the sacrificial insulating layer 216. Currently, the membrane layer 212 is 6 to 10 µm in thickness. Such thicknesses provide adequate structural integrity while not making the structure overly rigid or brittle.

In one embodiment, the membrane layer is a deposited polycrystalline layer. A low-pressure chemical vapor deposition process is used in one implementation. During deposition, typically a dopant, such as n-type, is added to improve conductivity while controlling the crystallinity and density of the polysilicon. Alternatively, other material systems are applicable such as silicon nitride, for example.

In a current process, a membrane wafer such as a doped silicon wafer is bonded to the oxide layer using elevated temperature and pressure. This process yields a highly crystalline membrane structure with the associated advantages.

After deposition or bonding, the membrane layer 212 is typically annealed and/or polished back to the desired membrane thickness, if necessary. A thin oxide layer 416 is preferably then grown on the membrane layer 212 to function as an etch protection layer.

Figure 3B:
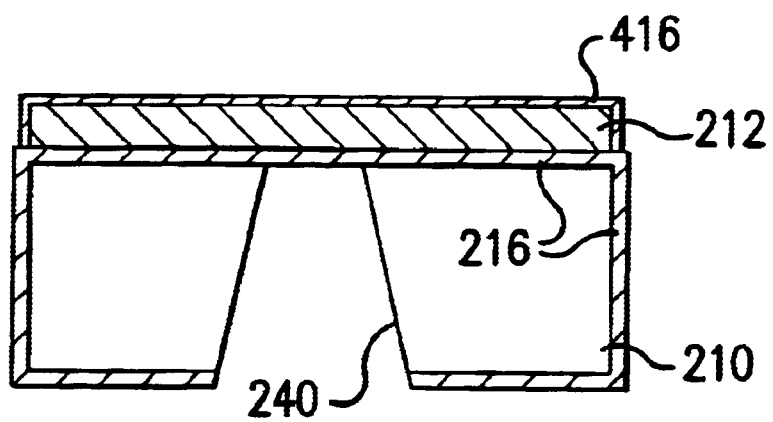

As shown in FIG. 3B, the optical port 240 can be patterned and etched into the handle or support wafer 210 in a backside etch process, preferably using a combination of isotropic and anisotropic etching. The sacrificial insulating layer 216 is used as an etch stop.

Figure 3C:
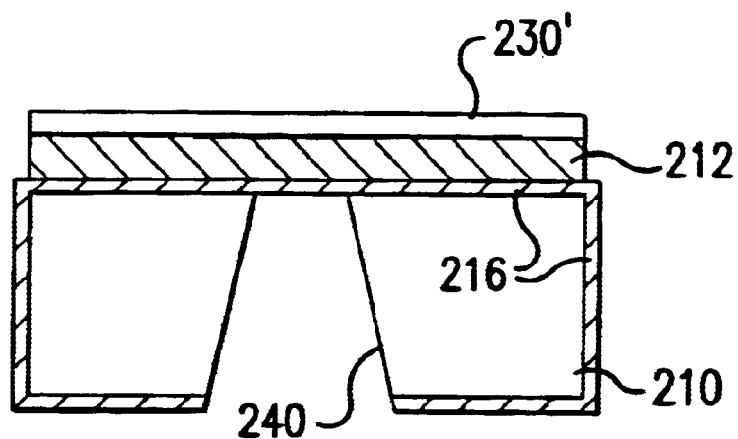
Figure 3D:
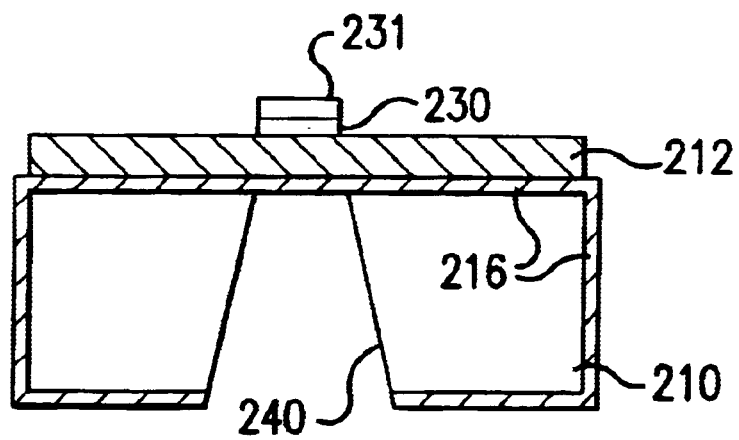

FIGS. 3C and 3D show the installation of the highly reflective (HR) spot 230, in one implementation. Specifically, the HR coating 230' is deposited on the membrane or device layer 212. The HR coating is preferably a multi-layer coating of 4 more thin film layers, preferably 8 or more, with a 16 dielectric layer mirror being used in the current embodiment. For a mirror structure, thin film layers of about ¼ the wavelength of the operation center frequency are common. Presently, a combination of silicon dioxide and titanium dioxide or tantalum pentoxide is used. The preferred method of patterning the dielectric coatings 230 is a dry etch process, such as reactive ion etching and reactive ion milling using a patterned photoresist layer 231 as an etch protection layer.

Figure 3E:
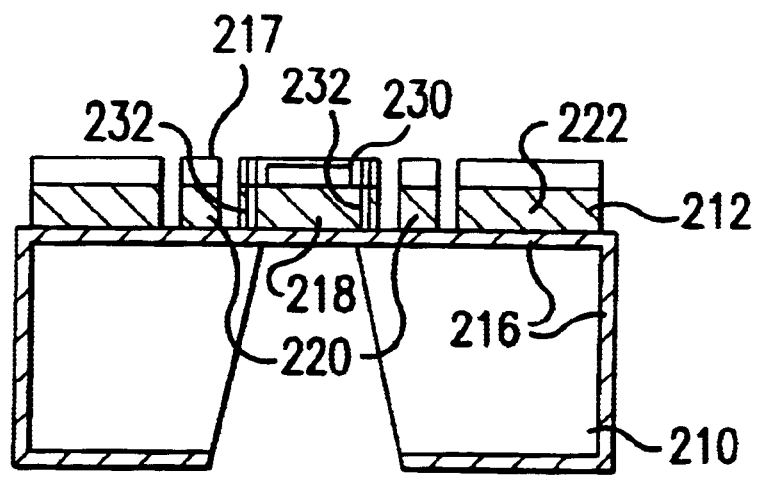

FIG. 3E shows the patterning of the membrane structure 214, including the tethers 220, membrane body 218, release holes 232, and outer portion 222, in the membrane layer 212. Specifically, a photoresist layer 217 is deposited and patterned with the membrane structure pattern. It also functions to protect the HR spot 233, in one implementation. The photoresist pattern is then transferred into the membrane or device layer 212 in a silicon etch process for example, using the sacrificial release layer 216 as a etch stop.

Figure 3F:
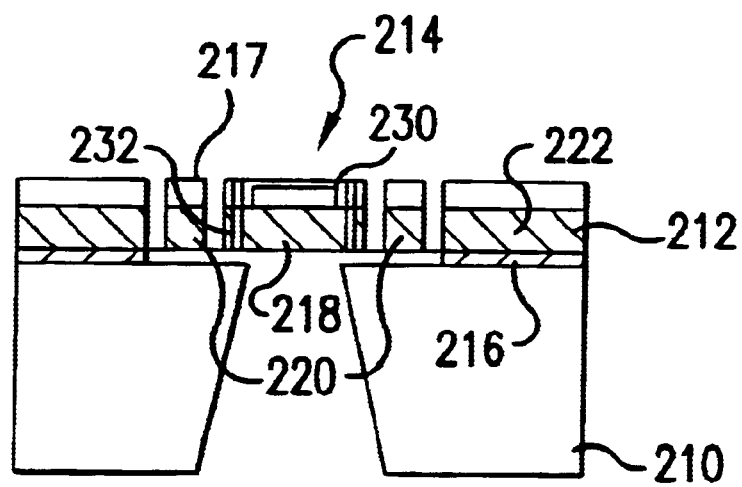

FIG. 3F illustrates the release process. An etchant is used to remove the insulation layer 216 from underneath the membrane layer 212 to thereby release the membrane structure 214.

In the illustrated embodiment, the photoresist layer 217 is used to protect the HR dot 230 from damage due to the etchant that is used to remove the sacrificial release layer 216. The etchant attacks the sacrificial layer underneath the membrane body 218 and the tethers 220. This process is facilitated by the infiltration allowed by the release holes 232.

Figure 3G:
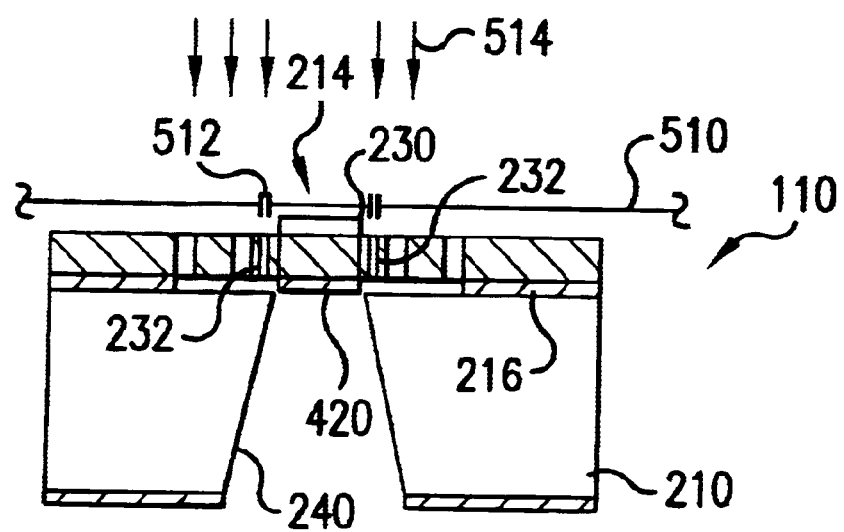

FIG. 3G illustrates the deposition of the backside anti-reflection (AR) coating 420 and fabrication of the discharge switch.

Specifically, the AR is deposited through the optical port 240.

Further, according to the present invention, the discharge switch, which is activated by pull-in of the membrane structure 214 is formed between the membrane structure 214 and the support 210 in the present embodiment.

In one implementation, a shadow mask 510 is installed over the membrane device 110. Shadow mask 510 has open portions or ports 512 that are aligned over all or selected ones of the release holes 232. Thereafter, a conductor 514 is deposited through the ports 512 and through the release holes 532 onto the support structure 210.

Currently, the shadow mask 510 is the same mask that is used to pattern the other from side metalizations such as bond pads 234 and the wire bond pads 334, 336.

Figure 4:
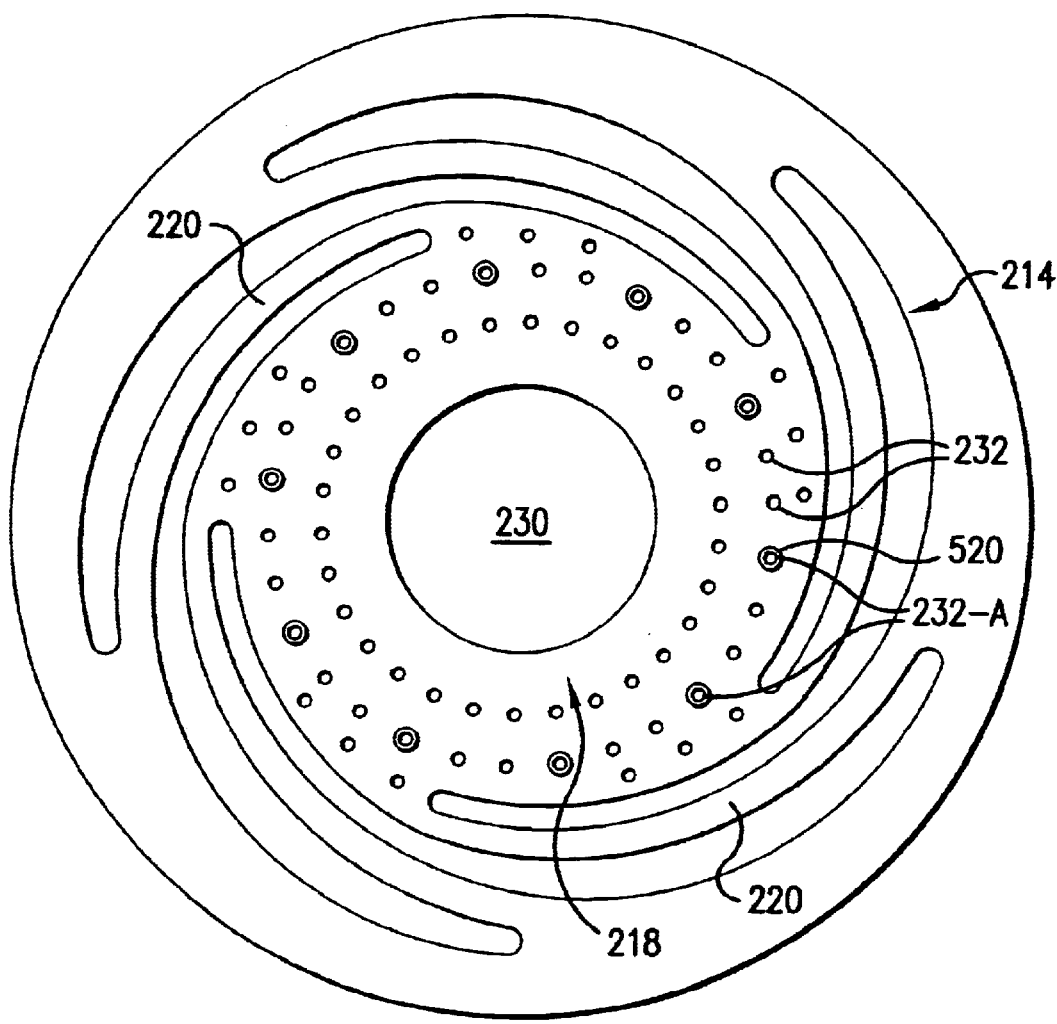
FIG. 4 is a plan view of the membrane body showing the deposition of the pad layer over the release holes.

FIG. 4 illustrates one embodiment of the membrane structure 214. Note, in this case, the configuration of tethers 220 is in a smooth spiral pattern as opposed to the dog leg pattern illustrated in FIG. 1.

More important is the fact that, selected HF holes have been coated with the conductor 514. See release holes 232A. This results in a halo 520 of the conductor material 514. The number of release holes 232 that receive the conductor coating is dependent on the level of stiction that is required. From experimentation, coating more HF holes reduces the likelihood of stiction attachment of the membrane structure 214 in the event of pull-in.

In the present implementation, the conductor material is a metal. Possible metals include nickel, titanium, chromium, nickel-gold, titanium-platinum-gold, chromium-gold, or other compatible metals, alloys, or metal systems. Presently, the shadow mask 510 is the same shadow mask that is used for the deposition of electrical and bond metal. Specifically, a titanium-platinum-gold (500 angstroms/500 angstroms/5000 angstroms) material system is being used. The deposition process is presently either via electron beam deposition or sputtering.

Figure 5:
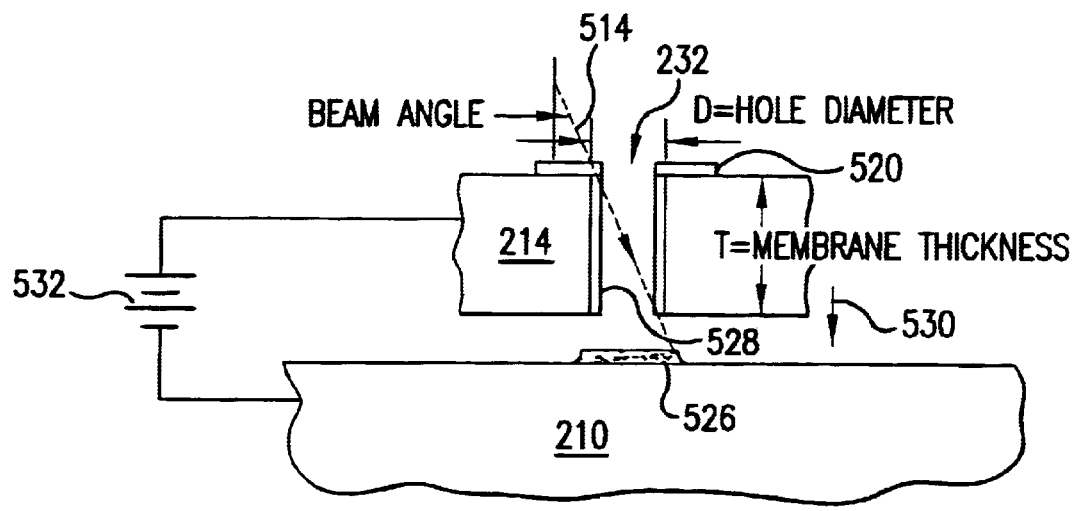
FIG. 5 is a schematic, partial cross-sectional view showing the fabrication of the membrane and support conductor pads.

FIG. 5 illustrates the formation of the discharge switch structure. Specifically, the conductor material or metal 514 is deposited through the release hole 232 onto the support structure surface that is adjacent to the membrane structure 214. The result is the formation of the support conductor pad 526 in the form of a bump. Additionally, some of the deposited metal forms a membrane conductor pad 528, lining the release hole 232.

In operation, when subject to pull-in, the membrane structure 214 moves in the direction of arrow 530 nearing contact with the support structure 210. This pull-in can be the result of an excessive drive voltage from voltage source 532. It can also occur due to an electrostatic discharge event or charge accumulation during some deposition or handling processes.

In any case, when subject to this pull-in, the membrane conductor pad 528 of the is membrane structure 214 tends to contact the support conductor pad 526. This process yields a relatively small net contact area between the membrane structure 214 and the support structure 210 since the support contact pad 526 tends to hold the remainder of the membrane 214 out of contact with the support 210.

Upon contact, the conductor-conductor interface between the membrane conductor pad 528 and the support conductor pad 526 creates a low resistance discharge path between the membrane layer 214 and the support structure 210. Discharge dissipates the electrostatic forces pulling the membrane structure 214 into the support structure 210, allowing the membrane structure 214 to return to its neutral-force position. This discharge shortens the time of contact between the membrane 214 and the support 210 while also minimizing the net stiction forces to thereby reduce the chance of stiction adhesion of the membrane structure 214 to the support structure 210.

Generally, as long as the discharge switch and specifically, the discharge path between the membrane conductor pads 528 and the support conductor pads 526 conducts charge between the membrane layer and the support 210 faster than it can be replenished by the voltage source 532, an oscillatory response is created. Further. striction adhesion of the membrane structure 214 to the support structure 210 or its welding to this support structure is avoided.

Figure 6:
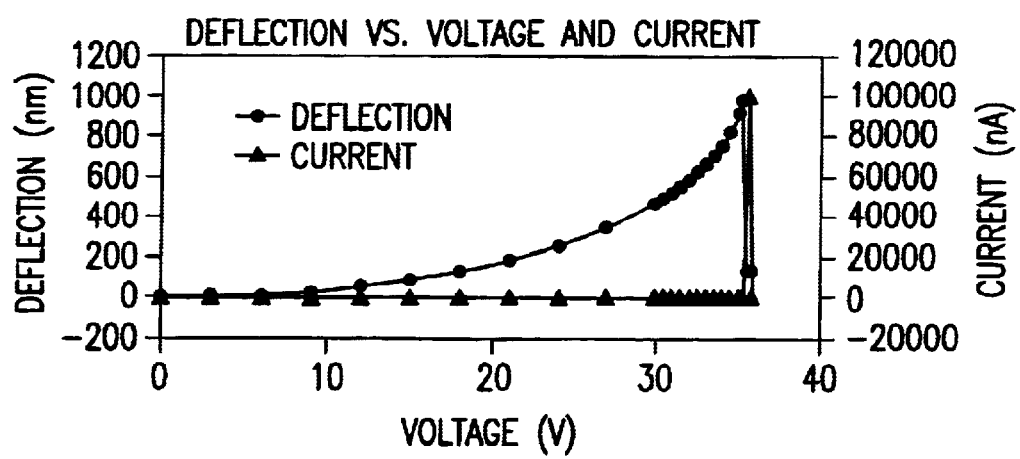
FIG. 6 is a plot of deflection of the membrane structure 214 in nanometers and drive current in nanoAmperes as a function of applied voltage in Volts from voltage source 532.

FIG. 6 is a plot of deflection as a function of electrostatic drive voltage. As illustrated, from approximately 0 to 35 volts, the membrane deflects smoothly from approximately 0 to about 1,000 nm. The drive current is approximately 0 nanoAmperes because of the generally capacitive structure between the membrane layer 212 and the support structure 210.

At approximately 37 volts, however, snap down occurs with the membrane structure 214 contacting the support. The current increases dramatically as electrostatic charge is dissipated between the membrane conductor pads 528 and the support conductor pads 526 by the operation of the discharge switch system.

In this illustrated example, oscillation is observed as the voltage charge is replenished between the membrane layer 212 and the support structure 210. The membrane structure 214 is again pulled-in, followed by another discharge.

In another embodiment, the discharge switch is fabricated prior to the release of the release structure. Specifically, after the patterning of the membrane layer 212, as illustrated in FIG. 3E, a portion of the sacrificial oxide layer 216 is removed from underneath some or all of the release holes 232. This could be achieved by depositing a second patterned photoresist based upon the location of the release holes, followed by a directional oxide etch.

The metal deposition is performed through the release holes 232 in the membrane structure 214 and the underlying holes in the sacrificial oxide layer 216 to the adjoining surface of the support structure 210. This process, however, suffers from complexity over the previously described process flow, since in the previous described process flow, the patterning of the discharge switch system is performed with the deposition of metal and electrical contact pads.

While this invention has been particularly shown and described with references to preferred embodiments thereof, it will be understood by those skilled in the art that various changes in form and details may be made therein without departing from the scope of the invention encompassed by the appended claims.

What is claimed is:

1. An electrostatically actuated optical system, comprising:
    an optical element;
    an electrode defining an electrostatic cavity across which an electrostatic voltage can be generated to drive movement of the optical element, and
    a discharge switch that is mechanically activated by pull-in of the optical element to discharge the electrostatic voltage.

2. An electrostatically actuated optical system as claimed in claim 1, wherein the optical element comprises a mirror structure.

3. An electrostatically actuated optical system as claimed in claim 1, wherein the optical element comprises a thin film dielectric mirror structure.

4. An electrostatically actuated optical system as claimed in claim 1, further comprising a release structure, on which the optical clement is formed.

5. An electrostatically actuated optical system as claimed in claim 1, further comprising a membrane, on which the optical element is formed.

6. An electrostatically actuated optical system as claimed in claim 1, wherein the discharge switch comprises a membrane conductor pad on the membrane that conducts current upon activation of the discharge switch to discharge the electrostatic voltage.

7. An electrostatically actuated optical system as claimed in claim 6, wherein the membrane conductor pad comprises a metal.

8. An electrostatically actuated optical system as claimed in claim 1, wherein the discharge switch comprises an electrode conductor pad on the electrode that conducts current upon activation of the discharge switch to discharge the electrostatic voltage.

9. An electrostatically actuated optical system as claimed in claim 8, wherein the discharge switch further comprises a membrane conductor pad on the membrane that engages the electrode conductor pad upon activation of the discharge switch to discharge the electrostatic voltage.

10. An electrostatically actuated optical system as claimed in claim 9, wherein the membrane conductor pad and the electrode conductor pad comprise a metal.

11. An electrostatically actuated optical system as claimed in claim 1, wherein the discharge switch dissipates charge across the cavity faster than charge can be replenished by a voltage source supplying the electrostatic voltage.

12. An electrostatically actuated optical system as claimed in claim 1, further comprising a release structure, on which the optical element is formed, the discharge switch being fabricated by depositing a conductor through the release structure to the electrode.

13. A process for fabricating stiction features on an electrostatically driven optical membrane, the process comprising:
    releasing a device layer from a support structure to form a release structure; and
    depositing support conductor pads on the support structure through the release structure.

14. A process as claimed in claim 13, wherein the step of releasing the device layer comprises removing a sacrificial layer between the release structure and the support structure.

15. A process as claimed in claim 13, wherein the step of depositing the support conductor pads comprises depositing through a mask formed in the release structure.

16. A process as claimed in claim 13, wherein the step of depositing the conductor comprises depositing a metal through release holes in the release structure.

17. A process as claimed in claim 13, further comprising depositing release structure conductor pads on the release structure that engage the support conductor pads upon deflection of the release structure.

18. A process as claimed in claim 13, further comprising patterning the device layer in the form of a membrane prior to the step of releasing the device layer from a support structure to form a membrane release structure.

19. A process as claimed in claim 13, further comprising optically coating the release structure.

20. A process as claimed in claim 13, further comprising optically coating the release structure with a dielectric thin film HR coating.

* * * * *